United States Patent [19]

Graf et al.

[11] Patent Number: 5,126,076
[45] Date of Patent: Jun. 30, 1992

[54] LOW-FLAMMABILITY STRUCTURAL ELEMENTS, PARTICULARLY BOARDS, AND PROCESS FOR CONSTRUCTING THEM

[75] Inventors: Robert Graf, Altenstadt; Dieter Annemaier, Illerkirchberg, both of Fed. Rep. of Germany

[73] Assignee: Chemische Fabrik Gruenau, Illertissen, Fed. Rep. of Germany

[21] Appl. No.: 635,175

[22] PCT Filed: Jul. 7, 1989

[86] PCT No.: PCT/EP89/00782
§ 371 Date: Mar. 15, 1991
§ 102(e) Date: Mar. 15, 1991

[87] PCT Pub. No.: WO90/00576
PCT Pub. Date: Jan. 25, 1990

[30] Foreign Application Priority Data

Jul. 16, 1988 [DE] Fed. Rep. of Germany ....... 3824149

[51] Int. Cl.$^5$ ............................ C08J 11/06; E04B 1/94
[52] U.S. Cl. .................................... 252/604; 252/607; 252/609; 106/18.11; 264/45.4; 264/45.8; 52/517; 52/DIG. 9; 428/921; 428/243; 428/537.5

[58] Field of Search ........................ 252/604, 607, 609; 106/18.11; 264/45.4, 45.8; 52/DIG. 9, 517; 428/921, 243, 537.5

[56] References Cited

U.S. PATENT DOCUMENTS

| | | | |
|---|---|---|---|
| 3,837,989 | 3/1970 | McCoy | 161/68 |
| 3,957,501 | 5/1976 | Matsuda et al. | 106/75 |
| 4,189,619 | 2/1980 | Pedlow | 174/88 |
| 4,994,113 | 2/1991 | Helmstetter | 106/618 |

FOREIGN PATENT DOCUMENTS 2307930 4/1975 France .

Primary Examiner—Richard D. Lovering
Assistant Examiner—N. Bhat
Attorney, Agent, or Firm—Ernest G. Szoke; Wayne C. Jaeschke; Real J. Grandmaison

[57] ABSTRACT

The invention relates to low-flammability structural elements, particularly boards, and to a process for constructing them. The low-flammability structural elements are constructed utilizing combustible plastics waste material. They contain in addition non-combustible inorganic additives and a flame-proofing agent mixture. The components are held together by at least one hardened adhesive. Because of this build-up the structural elements display, despite the combustible components, low-flammability.

20 Claims, No Drawings

LOW-FLAMMABILITY STRUCTURAL ELEMENTS, PARTICULARLY BOARDS, AND PROCESS FOR CONSTRUCTING THEM

The invention relates to low-flammability structural elements, particularly boards, and to a process for constructing them.

In industrialized countries large quantities of waste products, such as plastics parts, plastics films, fabric pieces, synthetic fibres and non-woven fabrics, are created during many different industrial manufacturing processes. To a large extent these unwanted waste products have in the past been dumped in landfills, occasionally causing major problems because of their lightweight, space requirement, wind scatter, or also posing ecological difficulties because they are either not microbially degradable or because chemical substances which can damage air, soil and waterways are released during their degradation. Thus, attempts have constantly been made to use these waste materials as raw material for new articles. For example, German Patent 34 16 473 describes a process for constructing mouldings from fibrous waste products and adhesive. The parts thus constructed are, in terms of mechanical and insulating properties, comparable with lightweight construction and insulating boards made from foamed plastics and have the advantage of relieving environmental pollution. However, in terms of fire protection, they are clearly inferior. Using the fire-shaft test procedure in accordance with DIN 4102, Part 1, there is such a violent fire phenomenon, associated with a quick spread of fire, that boards obtained according to German Patent 34 16 473 can only be classified as structural elements of normal flammability (building material class B 2) or even as readily flammable building materials (building material class B 3). Building regulations, however, increasingly require low-flammability building materials (building material class B 1 in accordance with DIN 4102, part 1).

Tests by the Applicant have shown that the addition of conventional flame-proofing agents, such as combinations of antimony trioxide and halogen-containing substances or aluminum hydroxide, when boards are constructed from waste polyester fibre material, even at relatively high concentrations (up to 20 wt-%), does not lead to the desired degree of fire-proofing. Even higher concentrations of these flame-retardants are not possible, because then only mouldings having quite unsatisfactory mechanical properties are obtained. Surprisingly, the effect of the flame-retardants described is so small that, in terms of fire-proofing, the mouldings obtained are no better than when the quantity of conventional fire-proofing agent is merely replaced by inorganic inert material such as calcium carbonate powder. Surface coating and/or lamination with flame-proofing agents would suggest themselves as a further known process. This can be achieved, for example, by laminating with inorganic fabrics, which, if need be, are additionally treated with flame-proofing coatings. However, even this method does not lead to the desired result.

The object of the invention is to provide structural elements which have the desired mechanical properties and moreover, still have low-flammability, by employing waste materials.

It has been found that structural elements which, apart from the waste material and the adhesive, contain in addition a combination of non-combustible inorganic additives and a flame-proofing agent mixture, possess the desired low-flammability but nevertheless still have good mechanical properties.

According to one aspect of this invention, there are provided low-flammable structural elements, particularly boards, made from a compressed mixture of 5 to 50 wt-% of inherently-combustible organic waste material, 75 to 20 wt-% of non-combustible inorganic additives, 4 to 40 wt-% of a flame-proofing agent mixture, and 3 to 25 wt-% at least one hardened adhesive serving to bind the components together. Boards or other mouldings, including tube casings, which consist of such a mixture, meet with a significant safety margin the criteria applied to "low-flammable building materials". Moreover, compared with numerous commercially available boards, mouldings or facing materials, they not only relieve environmental pollution, but also have technical advantages. Thus, compared with commercially available compressed chip boards, they are considerably lighter in weight, display more advantageous fire behavior and are more water-resistant. The latter property is particularly shown in that the water adsorption can be clearly reduced and furthermore no dimension changes such as swelling are observed. Compared with foamed plastic boards, they have advantages not only for fire-proofing, but also for acoustics and construction. The structural elements also have good soundproofing and heat-insulating properties.

The individual components, at least the plastics waste material and at least some of the inorganic additives, are preferably present in the structural elements in a heterogeneous mix, particularly in a coarse heterogeneous mix. This, surprisingly, has considerable advantages for fire behavior. The waste material is present in the structural element preferably in the form of particles or pieces, preferably from 1 to 20 mm in size, particularly 2 to 15 mm. Planar pieces having a thickness of 0.01 to 4 mm, particularly 0.5 to 2 mm, are particularly advantageous. The heterogeneous structure of the structural element has the effect that the individual pieces of the waste material can be arranged spatially separated from each other in the structural element, with non-combustible additives and/or flame-proofing agent lying interspersed between the pieces of the waste material. Consequently, if the structural elements come into contact with fire, although individual pieces of the waste material on the surface may indeed burn off, nevertheless the fire is unable to progress because of the adjacent inert filler or the fire-proofing agents.

The waste materials are advantageously present in the form of small pieces of non-woven fabrics, fibre balls, film chips and/or small pieces of foam. The invention is of particular importance for the reutilization of polyester fibres, which are generated in large quantities as waste products especially in the form of irregularly-sized planar pieces of non-woven fabrics and pose a considerable disposal problem. Not only plastics fibres, but also waste from natural fibres can be utilized, which preferably is likewise present, not in the form of individual fibres, but in the form of small pieces or particles. Thus, cellulose in the form of paper chips can be present, and cotton in the form of fabric pieces or fibre balls. Other plastics waste which may be present in the form of fibres, film pieces or in other lumpy form, are utilizable. Thus, for example, waste materials may also consist of polyacrylonitrile, polystyrene, nylon, polypropylene or polyethylene. Furthermore, the waste material does not necessarily have to consist of genuine waste. As with chip boards, which were originally constructed from waste chips, the inherently-combustible organic material can be specifically produced and prepared for use in the structural elements according to the invention.

The flame-proofing agent mixture is advantageously free of aliphatic and aromatic halogen compounds and, particularly, also free of antimony salts and other heavy metal compounds, so that in the case of fire no harmful substances are released, as is the case with these standard fire-proofing agents. Preferably, the entire structural element is free of such substances. The structural element is advantageously constructed rigidly and has a high degree of strength. Its strength is especially great when the waste materials are present as fibres. The structural element is mechanically workable and can, for example, be sawed, nailed, drilled and glued. Because of its heterogeneous and relatively coarsely-grained basic structure, the structural element is air-permeable and in addition has a low thermal conductivity. In addition, preferably the basic primary particles themselves are air-permeable, examples including the non-woven particles or fibre balls.

The surface of the structural element can be so designed that the individual components can be clearly distinguished, particularly so that the waste pieces and the inorganic additives are clearly recognizable and can be distinguished from each other. The overall density of the structural elements depends on the density of the individual components and on the degree of compression applied to the mixture. Generally, the density lies between 300 and 1000 kg/m$^3$, particularly between 350 and 800 kg/m$^3$. Densities in the range between 450 and 650 kg/m$^3$ have proved particularly successful in practice. The overall compressive strength of the structural elements is preferably at least 2 N/mm$^2$, particularly at least 3 N/mm$^3$. These are average values, as the heterogeneity, i.e., the distance between the particles, is normally in the range between 1 mm$^2$ and 100 mm$^2$.

The adhesive employed in the structural elements is at least partly a two-component adhesive or thermoset plastic. A hot-melt adhesive can also be used. In contrast to the other constituents, the adhesive is preferably evenly distributed throughout the structural element in order to uniformly strengthen the other components. The adhesive can also be an elastomeric adhesive, which, if desired, gives the structural element elastic properties, for example if a certain flexibility or elastic "give" is desired.

The inorganic fillers employed in the structural elements are preferably inert in terms of heat stability and/or chemical activity. They serve, on the one hand, to separate the combustible waste materials spatially from one another. On the other hand, they can also be used to adjust strength values, density and other mechanical properties. For most purposes, a combined use is preferred. Thus, the inorganic fillers are preferably partly, particularly at least preponderantly, present in the form of inorganic fibres. The fibre length is preferably in the range from 0.5 to 20 mm, but the fibres can also be considerably longer if the fibres are wound into fibre balls whose size is commensurate with that of the waste material particles. Such fibrous additives are especially advantageous where the waste material themselves do not provide sufficient strength to the structural element. Furthermore, fillers in the form of lightweight materials are especially advantageous where a structural element of low-density is desired. Such lightweight fillers are particularly of mineral origin. Examples of such lightweight fillers include hollow glass spheres, hollow alumino silicate spheres, swelling clay, expanded vermiculite or perlite as well as gas (lightweight) concrete. The particle size of these lightweight fillers is normally in the range between 0.01 and 2 mm. The inorganic fibre materials can be glass fibre, mineral fibre, slag wool and ceramic fibre. Particularly if the waste materials do not provide the structural element any particular strength, the fibrous fillers are present in greater quantities than non-fibrous fillers. In such case, the weight ratio of fibrous fillers to non-fibrous fillers is normally from 2 : 1 to 4 : 1, preferably approximately 3 : 1.

The flame-proofing agent mixture preferably works ablatively (energy—and/or material consuming) in two ways, and for this purpose contains preferably on the one hand carbonizing components, and on the other hand gas-emitting components. The carbonizing components serve to quickly lead to carbonization of the combustible components. No additional carbon donors for the carbonizing components need be provided, because in the case of fire, all carbonization is intended to take place at the combustible waste materials. The formation of carbon is desirable since it deprives one combustion process of carbon, at least initially. On the other hand, the flame-proofing agent mixture preferably also contains gas-emitting components which are not non-combustible gases or vapors. The carbonizing components and/or the gas-emitting components are advantageously water-insoluble or at least water-resistant, so that they are still effective even after being thoroughly soaked many times. Furthermore, the flame-proofing agent mixture may contain additives which have a vitrifying effect, such as borates. It is of particular advantage if the whole structural element is composed of water-resistant materials, so that it is not damaged or destroyed by the action of moisture or water.

As carbonizing component or carbonizing components, the flame-proofing agent mixture preferably contains at least one phosphate, particularly a condensed phosphate. An advantageous example of this is ammonium polyphosphate. The carbonizing effect of the phosphates develops even at temperatures as low as from approximately 200° C., i.e. even before flames can reach the corresponding sites. As gas-emitting components, hydroxides are suitable, such as aluminum hydroxide and, magnesium hydroxide, which split off water, and carbonates, such as calcium carbonate, which split off carbon dioxide. Basic carbonates can be used to split off water as well as $CO_2$. A combination of components which begin to release gas at different temperatures is preferred. Thus, aluminum hydroxide begins to split off water at approximately 200° C., whereas magnesium hydroxide begins to release water at approximately 350° C., so that the gas-emitting proceeds over a fairly large range of temperatures.

The process for constructing the structural elements according to the invention consists in gently mixing the individual mixture components with one another and compressing the resultant mixture to the desired density, the compression being maintained until the adhesive has hardened to a satisfactory degree. If hot-melt adhesives are used or thermoset adhesives which bond only at higher temperatures, then the compression is carried out at increased temperature, but still below the temperature at which the carbonizing components begin to act. Therefore, the compression temperature is normally maintained at a maximum of approximately 200° C. The mixing of the individual components is carried out in the afore-mentioned proportions. Combustible materials are preferably used in a quantity from 10 to 40 wt-%. For the non-combustible inorganic fillers, such as fibres and lightweight fillers, the preferred quantity is 70 to 25 wt-%. The quantity of the flame-proofing agent is preferably in the range of 7.5 to 30 wt-%. The preferred range of the binders or adhesives is 5 to 15 wt-%.

The waste parts are preferably added in the form of small pieces, mixing being carried out gently so that the waste parts are not significantly further reduced. The same likewise applies to the inorganic fibres or fibre structures.

Mixing is preferably carried out in the absence of water, particularly the components being in a dry state. The adhesive can, if desired, be added in liquid or dissolved form. The inorganic fillers, particularly the lightweight fillers, can be added in the size in which they are normally commercially available. The inorganic fibres can be reduced to a length of from 1 to 2 cm, or, if they are available in longer form, they can be utilized after being wound into balls. The fibre balls which are added are preferably maintained in their ball form by careful mixing.

The adhesive, in contrast, is preferably added as finely dispersed as possible in order to distribute it evenly throughout the mixture. For this purpose, the adhesive is preferably added in powder form. It is also possible to add, e.g. spray in, adhesive components in liquid form. Suitable adhesives include epoxy resins, formaldehyde condensates and other thermoset adhesives, as well as the usual hot-melt adhesives.

Further features of the invention are illustrated by the following examples, which have preferred embodiments of the invention as their subject. In the case of not only the examples but also the dependent claims, the individual features can in each case be effected either individually or in combination with one another, and are not limited to the examples.

EXAMPLE 1

15 wt-% of a chopped polyester non-woven fleece were placed in a ploughshare mixer. To this was sprayed 15 wt-% of a binder/flame-proofing agent mixture consisting of 30 wt-% urea formaldehyde resin, 18 wt-% ammoniumpolyphosphate, 20 wt-% dimelamine diphosphate, 10 wt-% magnesium hydroxide powder, as well as 22 wt-% water and auxiliaries, accompanied by mixing. After the water was thoroughly dried off from this pre-mixture, 15 wt-% glass microspheres as well as 49 wt-% mineral fibres and 6 wt-% of a phenolic resin were added and intensively mixed. The mixture was then compressed in a press at 200° to 220° C. for 5 minutes to produce a board having a density of 600 kg/m$^2$. When a fire-shaft test in accordance with DIN 4102, Part 1, was carried out on such boards, an average residual length of more than 15 cm and a maximum flue-gas temperature of 155° C. was measured.

EXAMPLE 2

20 wt-% of a chopped polyester non-woven fleece was intensively mixed in a ploughshare mixer with 9 wt-% ammonium polyphosphate, 3 wt-% aluminum hydroxide, 5 wt-% calcium borate, 7.5 wt-% calcium carbonate, 7 wt-% of a powdery epoxy resin-hardener mixture, 16 wt-% hollow aluminum silicate spheres, 29 wt-% glass fibres and 3.5 wt-% phenolic resin. The resulting mixture was then compressed in a press at 200° C. for 5 minutes to produce a board having a density of 750 kg/m$^2$. When a fire-shaft test in accordance with DIN 4102, Part 1 was carried out on such boards, an average residual length of more than 15 cm and a maximum flue-gas temperature of 170° C. was measured.

EXAMPLE 3

10.0 wt-% macerated polyethylene film (carrier bags) was intensively mixed in a ploughshare mixer with 45 wt-% ceramic fibres, 21 wt-% hollow alumino silicate spheres and 24 wt-% of a binder/flame-proofing agent mixture consisting of 56.9 wt-% phenolic resin, 14.4 wt-% ammonium polyphosphate, 16.2 wt-% aluminum hydroxide and 12.5 wt-% magnesium hydroxide. The resulting mixture was then compressed in a press at 180° C. for 10 minutes to produce a half-tube casing having a density of 600 kg/m$^3$. When a fire-shaft test in accordance with DIN 4102, Part 1, was carried out on such half-tube casings, an average residual length of more than 15 cm and a maximum flue-gas temperature of 135° C. was measured.

EXAMPLE 4

22.0 wt-% chopped polyacrylonitrile fibre waste was intensively mixed in a ploughshare mixer with 39 wt-% slag fibres, 10 wt-% perlite as well as 29 wt-% of a binder/flame-proofing agent mixture consisting of 36.2 wt-% of a polyvinyl acetate-ethylene copolymer, 19.7 wt-% ammonium polyphosphate, 28.3 wt-% aluminum hydroxide and 15.8 wt-% magnesium hydroxide. The resultant heterogeneous mixture was then compressed in a press at 190° C. for 8 minutes to produce a board having a density of 550 kg/m$^3$. When a fire-shaft test in accordance with DIN 4102, Part 1, was carried out on such boards, an average residual length of more than 15 cm and a maximum flue-gas temperature of 165° C. was measured.

EXAMPLE 5

32.0 wt-% paper chips was intensively mixed in a ploughshare mixer with 30.0 wt-% glass fibres, 12.5 wt-% perlite as well as 25.5 wt-% of a binder/flame-proofing agent mixture consisting of 23.5 wt-% melamine formaldehyde resin, 11.8 wt-% phenolic resin, 27.5 wt-% ammonium polyphosphate, 25.1 wt-% aluminum hydroxide and 12.1 wt-% magnesium hydroxide. The resultant mixture was then compressed in a press at 200° C. for 5 minutes to produce a board having a density of 600 kg/m$^3$. When a fire-shaft test in accordance with DIN 4102, Part 1, was carried out on such boards, an average residual length of more than 15 cm and a maximum flue-gas temperature of 140° C. was measured.

We claim:

1. A low-flammability structural element comprising a compressed mixture of
    (a) about 5 to about 50% by weight of an inherently-combustible organic material in the form of particles having a planar elongation of from about 1 to about 20 mm and a thickness of from about 0.01 to about 4 mm,
    (b) about 75 to about 20% by weight of a non-combustible inorganic filler selected from the group consisting of inorganic fibres and inorganic lightweight materials, (c) about 4 to about 40% by weight of a water-insoluble, flame-proofing agent mixture consisting of a carbonizing component and a gas-emitting component, (d) about 3 to about 25% by weight of a hardened adhesive binding together components (a), (b) and (c), wherein said components (a) and (b) are present as a heterogeneous mixture in a spatial arrangement of between about 1 mm$^2$ and about 100 mm$^2$, and the particles of said component (a) are arranged spatially separated from each other in said structural element with said component (b) and said component (c) located between said particles of component (a).

2. A low-flammability structural element as in claim 1 in the form of a board.

3. A low-flammability structural element as in claim 1 wherein said component (a) comprises a plastics waste material.

4. A low-flammability structural element as in claim 1 wherein said component (a) is present in the form of particles having a planar elongation of from about 2 to about 15 mm and a thickness of from about 0.5 to about 2 mm.

5. A low-flammability structural element as in claim 1 wherein said component (a) is present in the form of small pieces of non-woven fabrics, fibre balls, film chips or plastic foam pieces.

6. A low-flammability structural element as in claim 1 wherein said structural element is rigid.

7. A low-flammability structural element as in claim 1 having a compressive strength of more than about 2 N/mm$^2$.

8. A low-flammability structural element as in claim 1 wherein said component (b) inorganic fibres are present in a weight ratio of from about 2:1 to about 4:1 with respect to non-fibrous inorganic filler.

9. A low-flammability structural element as in claim 1 wherein said component (b) inorganic lightweight materials are of mineral origin.

10. A low-flammability structural element as in claim 1 wherein said component (c) carbonizing component comprises a phosphate compound.

11. A low-flammability structural element as in claim 1 wherein said component (c) gas-emitting component comprises at least two gas-emitting components which are activated at different temperatures.

12. A low-flammability structural element as in claim 1 wherein aid component (c) gas-emitting component is selected from the group consisting of a hydroxide and a carbonate compound.

13. A low-flammability structural element as in claim 12 wherein said hydroxide is selected from the group consisting of aluminum hydroxide and magnesium hydroxide.

14. A low-flammability structural element as in claim 1 which is free of aliphatic and aromatic halogen compounds, antimony salts, and heavy metal compounds.

15. A low-flammability structural element as in claim 1 wherein said components (a), (b), (c) and (d) are water-insoluble.

16. A process for preparing a structural element according to claim 20 comprising gently mixing together said components (a), (b), (c) and (d), compressing the mixture to a desired density, and maintaining the compression until the adhesive is hardened.

17. A process according to claim 16 including adding said component (a) in the form of small pieces, and mixing the mixture in a manner so that said components (a), (b), (c) and (d) are not significantly further reduced in size.

18. A process according to claim 16 wherein said components (a), (b), (c) and (d) are mixed in a dry state.

19. A process according to claim 16 including adding said component (d) in a finely-dispersed form.

20. A process according to claim 16 wherein said inorganic fibres are added in the form of balls or flocks, and the size of said balls or flocks corresponds approximately to the particle size of said component (a).

* * * * *

UNITED STATES PATENT AND TRADEMARK OFFICE
CERTIFICATE OF CORRECTION

PATENT NO. : 5,126,076
DATED : June 30, 1992
INVENTOR(S) : Graf et al.

It is certified that error appears in the above-identified patent and that said Letters Patent is hereby corrected as shown below:

In claim 16, column 8, line 23, "claim 20" should read --claim 1--.

Signed and Sealed this

Thirty-first Day of August, 1993

*Attest:*

BRUCE LEHMAN

*Attesting Officer*     Commissioner of Patents and Trademarks